R. DYMOCK.
STAKE LOCK.
APPLICATION FILED AUG. 23, 1920.
1,368,907.
Patented Feb. 15, 1921.
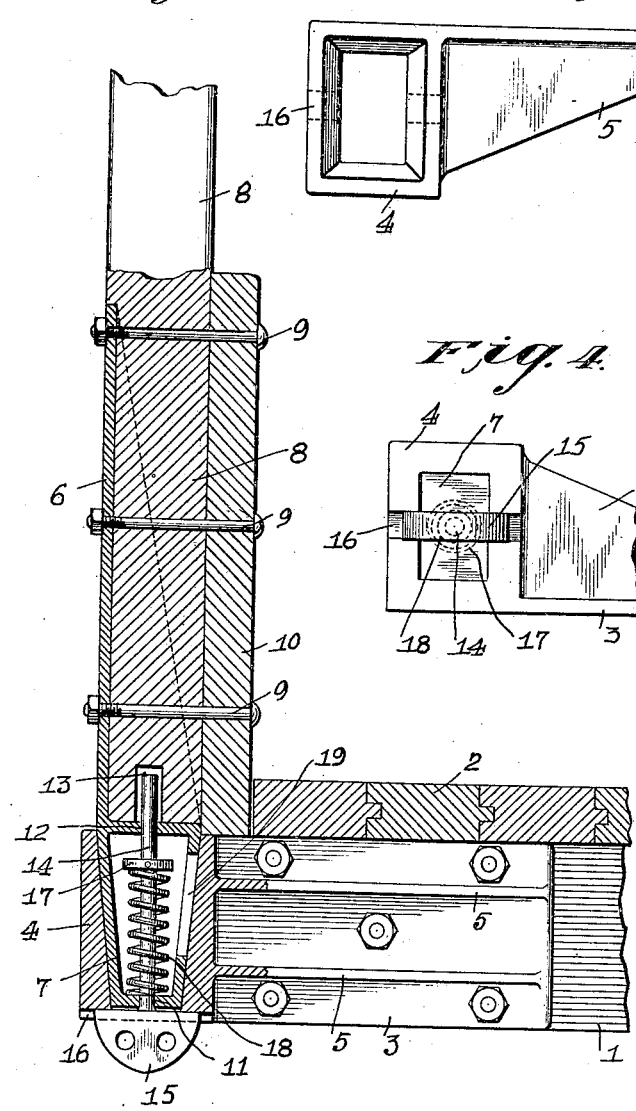
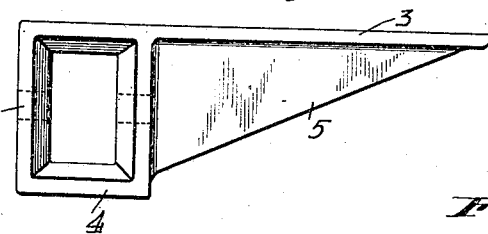
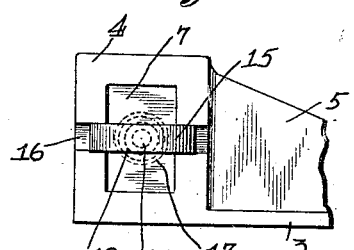
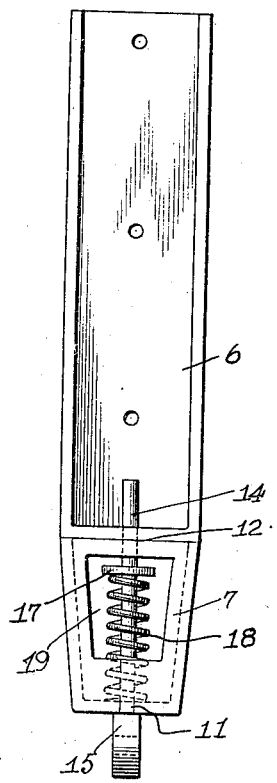
INVENTOR
RAYMOND DYMOCK

UNITED STATES PATENT OFFICE.

RAYMOND DYMOCK, OF HAMBURG, NEW JERSEY.

STAKE-LOCK.

1,368,907. Specification of Letters Patent. Patented Feb. 15, 1921.

Application filed August 23, 1920. Serial No. 405,280.

*To all whom it may concern:*

Be it known that I, RAYMOND DYMOCK, a citizen of the United States, and resident of Hamburg, in the county of Sussex and State of New Jersey, have invented a new and Improved Stake-Lock, of which the following is a full, clear, and exact description.

This invention relates to improvements in stake locks, an object of the invention being to provide a novel means for removably locking a stake in a pocket.

A further object is to provide a stake lock which will be simple and practical in construction, strong and durable in use, and comparatively cheap to manufacture.

A still further object is to provide a stake lock which may be utilized on wagon bodies, motor trucks, flat cars, and various other vehicles where stake locks are employed.

In the accompanying drawings;—

Figure 1 is a view mainly in longitudinal section, illustrating my improved stake lock applied to a motor truck.

Fig. 2 is a view in elevation of the lock.

Fig. 3 is a top plan view of the stake lock, and

Fig. 4 is a bottom plan view of the lock and pocket.

Referring in detail to the drawings, 1 represents a cross beam supporting the body of a vehicle, such as a motor truck. 2 represents the floor boards which constitute the loading body of the truck.

A bracket 3 is bolted or otherwise secured to the end of the cross beam 1, and a tapering rectangular stake pocket 4 is made integral with the bracket 3. Integral webs 5 may also be employed to strengthen the pocket.

A metal sleeve or support 6 is made integral with the tapering box-like casing 7, which fits the pocket 4. The sleeve 6 is adapted to receive a stake 8, and if desired, bolts 9 may be employed to bolt the sleeve 6, stake 8 and side board 10 of the truck body together, so that when the stake is removed the sleeve and side board come with it leaving an unobstructed flat loading bed for the truck. This construction, however, is merely optional, as the sleeve, stake and side board might constitute three separate and independent members. It is of course to be understood that any suitable number of such stakes are employed along the sides of the truck body.

The top and bottom of the casing 7 are provided with vertically alined openings 11 and 12 respectively, and the lower portion of the stake 8 is made with a recess 13 registering with the opening 12.

A pin 14 extends upwardly through the openings 11 and 12, and into the recess 13. The pin is provided with a handle 15 normally fitting in a groove 16 on the under face of the pocket 4. A fixed ring or disk 17 is provided around the pin 14 in the casing 7, and a coil spring 18 is located around the pin between the disk 17 and the bottom of the casing serving to lift the pin upwardly and hold the handle 15 in the groove 16.

As shown clearly in Fig. 4, the handle 15, while of sufficient length to lock against the under face of the pocket when positioned one way, will, if turned at right angles to the position illustrated, pass through the pocket.

The casing 7 is formed with an opening 19 in one wall thereof providing access to the spring. The operation is as follows;—
In order to lift the stake 8 and its associated parts off of the truck, it is merely necessary to grasp the handle 15, pull the pin 14 downwardly against the pressure of the spring 18 turn the handle 15 at right angles to the groove 16 and lift the stake, sleeve and locking mechanism out of the pocket.

Various slight changes and alterations might be made in the general form described without departing from my invention, and hence I do not limit myself to the precise details set forth, but consider myself at liberty to make such slight changes and alterations as fairly fall within the spirit and scope of the appended claims.

Having thus described my invention, what I claim as new and desire to secure by Letters Patent is as follows;—

1. The combination with a metal pocket, of a metal sleeve, a stake located in the sleeve and having a recess therein, a casing integral with the sleeve and fitting said pocket, said casing having alined openings in the top and bottom thereof registering with said recess, a pin projecting through said openings and into said recess, and means for retaining the pin in position.

2. The combination with a metal pocket, of a metal sleeve, a stake located in the sleeve and having a recess therein, a casing integral with the sleeve and fitting said pocket, said casing having alined openings in the top and bottom thereof registering with said recess, a pin projecting through said openings and into said recess, a fixed ring on the pin within the casing, and a spring around the pin between the disk and the bottom of the casing holding said pin in position.

3. The combination with a metal pocket, of a metal sleeve, a stake located in the sleeve and having a recess therein, a casing integral with the sleeve and fitting said pocket, said casing having alined openings in the top and bottom thereof registering with said recess, a pin projecting through said openings and into said recess, said pocket having a groove in the under side thereof, a handle on the pin located in said groove, a spring around the pin holding the handle in the groove, and means whereby said handle may be positioned transversely of the groove to allow the removal of the stake and its associated parts from the pocket.

RAYMOND DYMOCK.